Patented Feb. 14, 1939

2,146,738

UNITED STATES PATENT OFFICE

2,146,738

MIXED ETHER ESTERS OF CELLULOSE

Joseph F. Haskins, Wilmington, Del., assignor to E. I. du Pont de Nemours & Company, Wilmington, Del., a corporation of Delaware No Drawing. Application December 20, 1935, Serial No. 55,495

13 Claims. (Cl. 260—100)

This invention relates to mixed ether esters of cellulose, more particularly ether esters of cellulose which are soluble in organic solvents, and a process for the preparation thereof.

The reaction of alkali-stable acid chlorides and/or anhydrides on alcohols in the presence of aqueous alkali, which is known in the art as the "Schotten-Baumann reaction", is a well known method of preparing esters. Attempts to prepare cellulose esters by this process have been recorded in the literature. These attempts have been only partially successful in that, when the cellulose used is undegraded, esters are obtained which are insoluble or only partly soluble in organic solvents, and in order to get a completely soluble ester it has been necessary to use a very greatly degraded cellulose.

Various cellulose ethers, such as, for example, methyl cellulose or ethyl cellulose, have also been prepared by well known methods of alkylation. The characteristics of these cellulose ethers vary according to the degree of alkylation and, to some extent, according to the degree of degradation of the cellulose. Thus, with a relatively small degree of alkylation they may be alkali-soluble. With a higher degree, they may be water-soluble; and with a still higher degree of alkylation they may become soluble in organic solvents.

Certain mixed ether esters of cellulose have also been described in the literature. For example, Glover et al., U. S. Patent No. 1,613,451 disclose the preparation of cellulose ether esters by the action of the acid in the presence of the catalyst on the dry, partially substituted ether. In U. S. Patent No. 1,763,428 the same inventors disclose the esterification of the dry, partially substituted ether by means of acetic anhydride. In U. S. Patent No. 1,877,779 there is disclosed the acetylation of dry alkyl cellulose containing 0.5 to 1.5 alkyl groups per $C_6H_{10}O_5$ unit by means of the anhydride and a catalyst. Lilienfeld, in U. S. Patent No. 1,589,607 discloses the acetylation of dry cellulose ethers of the type which are soluble in dilute alkali. In general, however, it has been found that the mixed ether esters of cellulose which can be prepared in accordance with the above described methods are limited practically to the acetate, propionate and butyrate.

One of the objects of the present invention is to provide an improved process of producing certain mixed ether esters of cellulose which are of good quality as represented by solubility, viscosity and substitution characteristics. Another object is to produce mixed ether esters of cellulose, some of which are new to technology. A further object is to provide a new and improved process for producing mixed ether esters of cellulose. A still further object is the preparation of certain new and improved heterocyclic ether esters of cellulose. An additional object is to produce new and improved cellulose ether furoates. Other objects will appear hereinafter.

In accomplishing these objects according to the broader aspects of this invention, cellulose derivatives are prepared by acting on a solution, in dilute alkali, of an alkali-soluble cellulose ether with an esterifying agent which is relatively stable in the presence of dilute alkali. It has been found, for example, that cellulose esters of good quality, as represented by complete solubility in organic solvents accompanied by high viscosity as well as a uniformly high degree of substitution, may be readily obtained in one step by acting upon a solution in dilute alkali of an alkali-soluble, low-substituted ether of cellulose with esterifying agents such as those acid chlorides and/or anhydrides which are not too rapidly hydrolyzed in the presence of dilute alkali. It has been found, moreover, that it is preferable to have the cellulose ether used as an intermediate actually in solution, especially where it is desired to get a completely soluble product, and that the presence of an insoluble fraction in the solution results in a corresponding fraction of an ether-ester which is insoluble in organic solvents.

In general, the process of this invention is applicable to the esterification of partly substituted cellulose ethers which are soluble in dilute alkali, with the exception of ethers such as cellulose glycollic acid in which an acid group is present. The process of the invention is applicable to the use of those esterification reagents which have moderate stability to the action of dilute aqueous alkali, the degree of stability required being, in general, that of esterification reagents known to be suitable for the esterification of alcohols by the Schotten-Baumann reaction. In this specification, such reagents are referred to as "alkali-stable".

The invention will be further illustrated, but is not limited, by the following examples in which the molar ratios refer to moles per glucose unit of the cellulosic ether used.

EXAMPLE I

*Preparation of methyl cellulose para-toluene sulfonate*

Two hundred (200) grams of a methyl cellulose containing 0.34 methyl group for each glucose unit of the cellulose, which dissolved only partly in dilute alkali at room temperature but which was completely dissolved by cooling with dilute alkali, was dispersed in 3250 grams of a 7.7% sodium hydroxide (5.3 moles of NaOH per mole of methyl cellulose). The partial solution was cooled rapidly to —10° C. and then allowed to come back to 0° C., with stirring. Two (2) cc. of sulfonated castor oil was stirred in, and then a solution of 950 grams of para-toluene sulfonyl chloride (4.3 moles per mole of cellulose) in 1000 grams of benzene was added rapidly while stirring. Chopped ice was added to keep the temperature at or below 0° C., while stirring was continued. The emulsion formed rapidly thickened until in about fifteen minutes a stiff gel was formed. This was broken up and stirring continued. After about ten minutes more, the temperature of the reaction mixture was allowed to rise gradually to room temperature. After about four hours the reaction mixture was neutral to litmus. An excess of dilute sodium hydroxide (about 100 grams dissolved in 200 cc. of water) was then added and stirring continued for about eight hours or longer. Live steam was passed into the resulting mixture to remove the benzene, the solid (which may have become fused together during the steam distillation) was broken up, washed by soaking it for two days in running water, and dried. This yielded 454 parts of a methyl cellulose para-toluene sulfonate soluble in organic solvents including dioxane, chloroform-alcohol (90—10) and pyridine. Analysis (11.08% S) indicates the presence of 1.25 para-toluene sulfonyl groups for each glucose unit of the cellulose nucleus.

Purification of the above reaction mixture may also be accomplished by draining off the aqueous layer, extracting with alcohol to remove toluene, washing with water and drying.

EXAMPLE II

*Preparation of methyl cellulose benzene sulfonate*

The procedure was the same as Example I except that, in place of the benzene solution of para-toluene sulfonyl chloride, 880 grams of benzene sulfonyl chloride were added, without diluent. The reaction followed much the same course, and there was obtained methyl cellulose benzene sulfonate soluble in dioxane, chloroform-alcohol (90—10), pyridine and other organic solvents.

EXAMPLE III

*Preparation of glycol cellulose beta-naphthalene sulfonate*

Two hundred (200) grams of a glycol cellulose made by reacting alkali cellulose with 2 moles of ethylene oxide were dissolved in 2700 cc. of 8% sodium hydroxide (4 moles NaOH). This solution was frozen at —15° C. and allowed to thaw.

One hundred (100) grams of the above solution containing about 7 grams of glycol cellulose was cooled to 0° C., and a solution of 42 grams of beta-naphthalene sulfonyl chloride (5.6 moles) in 100 cc. of benzene was added, together with cracked ice to keep the temperature at about 0° C. The mixture was stirred rapidly. In about one-half hour a good emulsion was formed. The temperature was now allowed to rise slowly to 30° C. The emulsion then broke, grainy particles separating out. This mixture was heated for four hours on a water bath, and filtered. The glycol cellulose beta-naphthalene sulfonate was washed well with water and with methanol and dried. The yield was 22.5 grams (321%), indicating approximately two beta-naphthalene sulfonyl groups for each $C_6$ unit of the cellulose.

EXAMPLE IV

*Preparation of glycol cellulose benzoate*

Three thousand twenty (3020) grams of a 2.8% solution of alkali-soluble glycol cellulose having approximately 0.25 glycol group for each $C_6$ unit of the cellulose, containing 5% sodium hydroxide (9.2 moles) was cooled until it contained ice crystals; 528.5 grams of benzoyl chloride (7.2 moles) were added, and the mixture was stirred rapidly. Cracked ice was added from time to time to keep the reaction temperature at 0° C. or lower. Solid particles began to separate out almost at once and, after about fifty minutes, the mixture was acid to litmus. The solid which had separated out was filtered off through a cloth bag, washed for twenty-four hours in running water, extracted with methanol, washed again for twenty-four hours in running water, and dried. This yielded 176 grams (208%) of a glycol cellulose benzoate, soluble in chloroform-alcohol (90—10), pyridine, toluene-alcohol (80—20) and dioxane, giving solutions of high viscosity. Analysis of a glycol cellulose benzoate so prepared shows 57.68% benzoyl equivalent to 1.94 benzoyl groups for each glucose unit of the cellulose.

EXAMPLE V

*Preparation of methyl cellulose furoate*

Twenty-three (23) grams of methyl cellulose such as that described in Example I were dissolved in a solution of 28.6 grams of sodium hydroxide (5.3 moles) in 360 grams of water. The dispersion was frozen at —15° C. and allowed to thaw, with stirring, to give a good solution of methyl cellulose. To this solution were added 92.85 grams (5 moles per mole of methyl cellulose) of furoyl chloride, while stirring rapidly. Cracked ice was added to keep the temperature at or below 0° C. The reaction mixture turned acid to litmus in about five minutes and a white solid separated out. Excess ammonium hydroxide was then added to destroy any remaining furoyl chloride and the mixture was allowed to stand for two hours. The precipitate was filtered off, washed well with water, then with alcohol to displace the water. While still wet with alcohol, the precipitate was dissolved in dioxane to make a 15–20% solution. From this solution a film was cast which was clear and transparent and which became insoluble on drying.

EXAMPLE VI

*Preparation of glycol cellulose furoate*

The procedure was the same as Example V except that an alkali-soluble glycol cellulose was used as the starting material. This product was soluble, before drying, in dioxane.

These furoyl derivatives of cellulose, if made at a low temperature are completely soluble in organic solvents. If the reaction is carried out at an elevated temperature or if the products are dried and exposed to air or an elevated temperature (as 65° C.), they become insoluble.

EXAMPLE VII

*Preparation of glycol cellulose chloromethyl benzoate*

Fifty (50) grams of a glycol cellulose solution made by dissolving 200 grams of an alkali-soluble glycol cellulose prepared by the action of two moles of ethylene oxide on alkali cellulose, in 2700 cc. of 8% sodium hydroxide (5.4 moles NaOH per mole of glycol cellulose) were allowed to react at room temperature with 13 grams (4.1 moles) of phthalid chloride ($ClCH_2C_6H_4COCl$), the temperature being kept at approximately 25° C. by immersing the reaction vessel in a water bath and the reaction mixture being constantly stirred. A white, insoluble material separated out. After about fifteen minutes, the reaction mixture was warmed to 80° C. for two hours and then allowed to stand at room temperature for sixteen hours. The white solid was filtered off, washed with water and methanol, and dried. It proved to be soluble in organic solvents, such as chloroform-alcohol (90—10) or dioxane. Analysis showed a chlorine content of 12.47% which indicates an ester containing about two chloromethyl benzoyl groups for each glucose unit of the cellulose.

Example VIII

Preparation of glycol cellulose phthalate

Four (4) parts of glycol cellulose soluble in alkali (made by the action of one mole of ethylene oxide on alkali cellulose) were dissolved in a solution of 4 parts of sodium hydroxide (5.2 moles) in 40 parts of water. The dispersion so secured was frozen at —15° C., allowed to thaw and a suspension of 14 parts (5 moles) of phthalic anhydride in 50 parts of benzene added with vigorous stirring. Cracked ice was added from time to time to keep the temperature at 0° C. or lower for about three hours. The temperature was then allowed to rise slowly and stirring continued for sixteen hours. This gave a solution. Dilute hydrochloric acid was added to precipitate the glycol cellulose phthalate which was washed well with water and methanol. The resulting derivative was soluble in dilute ammonium hydroxide, from which solution it may be reprecipitated by acids.

Example IX

Preparation of glycol cellulose para-toluene sulfonate

In many cases it is not necessary to purify the reaction mixture from the preparation of the low substituted ether. The following example illustrates this:

One hundred sixty-two (162) grams of wood pulp were steeped in 19% sodium hydroxide, pressed to 405 grams and shredded for two hours at 25° C. The alkali cellulose thus formed was placed in a flask which was slowly rotated while allowing 45 grams (about 1 mole) of ethylene oxide to evaporate spontaneously at 20° C. into it. After sixteen hours the reaction mixture was dissolved in a solution of 157 grams of sodium hydroxide in 1420 grams of water (total NaOH about 5 moles). The solution was frozen and allowed to thaw. Two (2) cc. of Turkey red oil were added and then 760 grams of para-toluene sulfonyl chloride (4 moles) dissolved in 1000 cc. of benzene, the reaction being carried out as in Example I. The glycol cellulose para-toluene sulfonate was soluble in organic solvents and contained approximately two sulfonic acid groups for each $C_6$ unit of the cellulose. The yield was 390 grams (240%).

Example X

Preparation of ethoxy-ethyl cellulose benzoate

One hundred (100) grams of an ethoxy-ethyl cellulose, soluble in dilute alkali, such as is described in my U. S. application Serial No. 49,034 filed November 9, 1935, were dispersed in a solution of 114 grams of sodium hydroxide in 1000 grams of water. The dispersion was frozen, and then thawed to give a smooth solution. Two (2) cc. of sulfonated castor oil were added and well stirred in, then 320 grams of benzoyl chloride. Cracked ice was added and the mixture stirred vigorously, ice being added from time to time to keep the temperature at or below 0° C. After a short time the reaction mixture turned acid. The precipitate was filtered off, extracted with alcohol and washed with water. The resulting ethoxy-ethyl cellulose benzoate was soluble in organic solvents such as dioxane 80—alcohol 20.

In addition to the mixed ether-esters exemplified above, the process of the invention is applicable to the preparation of a large number of other compounds in this class. As intermediates I use dilute alkali-soluble low-substituted cellulose ethers, for example, lower alkyl ethers, hydroxy-alkyl ethers or alkoxy-alkyl ethers. It is desirable that the low-substituted cellulose ether used as intermediate be soluble in dilute aqueous caustic soda of maximum solvent activity (i. e., 9–10%) and at some temperature within the range between normal temperature and the freezing point of the caustic soda solution. The degree of substitution having the required solubility depends to some extent on the viscosity of the low-substituted cellulose ether but, in general, it may be said that with methyl cellulose or ethyl cellulose ethers substituted from about one-fourth to one-half mole per $C_6$ unit of the cellulose have satisfactory solubility for the purpose. Glycol ethers are satisfactorily soluble from about one-fourth mole up to one mole substituent. However, depending on viscosity and method of preparation, satisfactory solubility may be obtained somewhat above or below these ranges of substitution.

One method of controlling the viscosity of the cellulose ester is by controlling the aging of the alkali cellulose used in preparation of the intermediate. The esterification itself, if carried out as herein described, has little, if any, degrading effect on the cellulose. It is usually preferable to so age the alkali cellulose in the preparation of the cellulose ether intermediate as to give a fairly low-viscosity, alkali-soluble ether, especially when it is desired to avoid obtaining as the final product an ester of too high viscosity.

Among the esterifying agents which have been found to have sufficient alkali-stability to react well in the process of this invention are benzoyl chloride, chlor-benzoyl chloride, nitrobenzoyl chloride, phthalic anhydride, methacrylic anhydride, benzene sulfonyl chloride, para-toluene sulfonyl chloride, beta-naphthalene sulfonyl chloride, furoyl chloride, alpha-chloro-methyl benzoyl chloride (phthalid chloride). In general, the best results have been obtained with acid chlorides and anhydrides of cyclic compounds, either of the aromatic or heterocyclic series. In general, the acid chlorides and anhydrides of saturated aliphatic acids are not sufficiently alkali-stable to give useful results.

The cyclic portion of the ester group may be, for example, a benzene, naphthalene or anthracene nucleus which is unsubstituted or substituted, for example, by halogen atoms (e. g., chlorine, bromine or iodine), alkyl groups (e. g., methyl, ethyl, propyl, etc.), nitro groups, alkoxy groups (e. g. methoxy, ethoxy, butyloxy, etc.), or a plurality of said groups. The cyclic portion of the ester group may also be a heterocyclic nucleus such as a residue of furoic acid. Preferred mixed ether esters of cellulose which may be prepared by the general process are: methyl cellulose benzoate, ethyl cellulose benzoate, hydroxy ethyl cellulose benzoate, and the corresponding chlorobenzoates, nitrobenzoates, phthalates, methacrylates, benzene sulfonates, para-toluene sulfonates, beta-naphthalene sulfonates and furoates. In general, the applicability of the invention to the preparation of a given ether ester of cellulose is dependent on the availability of a suitable dilute alkali-soluble cellulose ether and of a suitable alkali-stable esterifying agent.

The ratio of alkali to esterifying agent to cellulose ether may be varied but is of some importance, particularly where the esterifying agent is an acid chloride. Generally speaking, a molar ratio of alkali to acid chloride of about 1 to 1 or about 5 to 4 is suitable. Too great an excess of alkali over acid chloride or of acid chloride over alkali seems to lead to poor yields. However, the preferred ratio depends somewhat on the acid chloride used and the ester formed. In the case of the benzoate, furoate and other carboxylic acid esters which are relatively sensitive to alkali, it is best to have the reaction end acid. In the case of the sulfonates, which are more alkali-resistant but easily hydrolyzed by acid, the reaction mixture should preferably be kept alkaline and a larger proportion of alkali may be used originally or, better, excess alkali may be added after the reaction is practically completed. The molar ratio of acid chloride to cellulose, in any case, should preferably be at least 4 to 1 when it is desired to produce a product soluble in organic solvents. In general, where a product soluble in organic solvent is desired, it is preferable to use an excess of esterifying agent over the theoretical requirement for a tri-substituted cellulose derivative.

The amount of water may vary within relatively wide limits dependent upon the desired alkali concentration. The maximum solvent power of caustic soda solution is at 9–10% sodium hydroxide, but 12% or less of an alkali is considered to be "dilute" for this process. The preferred alkali concentration is 6–10% by weight of the solution.

The temperature at which the reaction is carried out should ordinarily be about from −5° C. to 25° C., i. e., low enough to keep the low-substituted cellulose ether in solution in the alkali. In general, the yield of ester is better at the lower temperature, since low temperatures seem to favor the esterification over the competing reactions, hydrolysis of the acid chloride or anhydride and saponification of the ester formed. In the case of the sulfonates, which are more resistant to alkali, this effect is not so noticeable and, in any case, after the reaction has proceeded to a stage where the greater part of the esterification has taken place, the temperature may be raised, even to 100° C., without harm.

Purification may be accomplished by merely washing with water but, where a diluent has been used, it may be desirable to extract with alcohol to remove the diluent. In some cases, the diluent may be steam distilled away from the reaction mixture and recovered. Suitable diluents, or solvents, are for example, the aromatic hydrocarbons.

The process of the invention is useful in preparing a large variety of cellulose ether esters which are of good color, good solubility and good viscosity. These esters may be employed in the formation of films or filaments, plastics, lacquers, and for other related uses or as intermediates for further reactions. It is possible, in accordance with the invention, to prepare soluble cellulose ether esters as, for instance, benzoates and furoates, which have not hitherto been prepared or which have been prepared only with difficulty by previously known processes.

As many apparently widely different embodiments of this invention may be made without departing from the spirit and scope thereof, it is to be understood that I do not limit myself to the specific embodiments thereof except as defined in the appended claims.

I claim:

1. The process of preparing methyl ether cellulose sulfonic acid esters of the benzene series which comprises dissolving a low-substituted methyl cellulose containing from about 0.25 to about 0.5 methyl groups per $C_6$ unit of the cellulose in 6–10% alkali metal hydroxide solution, cooling to below 0° C., adding a small amount of sulfonated castor oil, adding about four moles of para-toluene sulfonyl chloride dissolved in an equal weight of benzene, stirring the mixture until the emulsion breaks into an aqueous layer and a benzene layer, adding sufficient aqueous alkali metal hydroxide to prevent the mixture from turning acid while continuing the stirring, and extracting the methyl cellulose para-toluene sulfonate from the benzene layer.

2. The process of preparing organic solvent soluble cellulose esters which comprises mixing a low substituted methyl cellulose, the methyl substituents of which are present in an amount less than 0.5 methyl groups per $C_6$ unit of the cellulose and which is insoluble in 6–10% alkali metal hydroxide solution at ordinary temperatures, with a 6–10% metal alkali hydroxide solution in an amount sufficient to dissolve the methyl cellulose upon cooling, cooling to below 0° C. to dissolve the methyl cellulose, adding a small amount of sulfonated castor oil, adding about four moles of para-toluene sulfonyl chloride dissolved in an equal weight of benzene, stirring the mixture until the emulsion breaks in an aqueous layer and a benzene layer, adding sufficient aqueous alkali metal hydroxide to prevent the mixture from turning acid while continuing the stirring and isolating the methyl cellulose para-toluene sulfonate.

3. The process of preparing dioxane soluble methyl ether cellulose toluene sulfonic acid esters which comprises treating a 6–10% sodium hydroxide solution of methyl cellulose containing about 0.25 to about 0.5 methyl groups per glucose unit of cellulose with para-toluene sulfonyl chloride.

4. The products obtainable according to the process of claim 1.

5. The products obtainable according to the process of claim 2.

6. The products obtainable according to the process of claim 3.

7. A dioxane soluble methyl ether toluene sulfonic acid ester of cellulose containing about 0.25 to about 0.5 methyl groups and about 1.25 para-toluene sulfonyl groups per glucose unit of the cellulose.

8. The process of preparing organic solvent soluble cellulose ether-esters from cellulose ethers which contain no free acid groups, which are soluble in 9–10% aqueous caustic soda, and which are not rendered organic solvent soluble when subjected in solid form to the Schotten-Baumann reaction, which comprises dissolving said cellulose ether in dilute aqueous caustic alkali and treating the resultant solution with an alkali stable cyclic esterifying agent having the degree of dilute aqueous alkali stability required for the Schotten-Baumann esterification reaction until the resultant cellulose ether-ester is organic solvent soluble.

9. The process of claim 8 when the cellulose ether is a low alkyl cellulose ether substituted in the range 0.25 to 0.5 substituent radicals per glucose unit of the cellulose.

10. The process of claim 8 when the cellulose ether is a glycol cellulose ether substituted in the range 0.25 to 1.0 substituent radicals per glucose unit of the cellulose.

11. The process of claim 8 when the cellulose ether is substituted in the range 0.25 to 1.0 substituent radicals per glucose unit of the cellulose and the esterifying agent is selected from the group consisting of benzoyl chloride, chlor-benzoyl chloride, nitro-benzoyl chloride, phthalic anhydride, methacrylic anhydride, benzene sulfonyl chloride, para-toluene sulfonyl chloride, betanaphthalene sulfonyl chloride, furoyl chloride, and alphachloromethyl benzoyl chloride.

12. The products obtained by the process of claim 8.

13. The products obtained by the process of claim 11.

JOSEPH F. HASKINS.